United States Patent [19]

Bell, Jr. et al.

[11] 4,249,059
[45] Feb. 3, 1981

[54] GAP CONDITION LIGHT INDICATOR SYSTEM FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 832,215

[22] Filed: Sep. 12, 1977

[51] Int. Cl.³ ............................................. B23P 1/02
[52] U.S. Cl. ............................ 219/69 G; 219/69 C
[58] Field of Search .............. 219/69 G, 69 C, 69 M

[56] References Cited

U.S. PATENT DOCUMENTS

| | | | |
|---|---|---|---|
| 3,878,351 | 4/1975 | Rocklin | 219/69 C |
| 3,969,601 | 7/1976 | Rocklin | 219/69 C |
| 3,997,753 | 12/1976 | Inone | 219/69 C |
| 4,021,635 | 5/1977 | Losey et al. | 219/69 G |
| 4,071,729 | 1/1978 | Bell | 219/69 G |

OTHER PUBLICATIONS

Toureno, "An Introduction to Microprocessors" Electronic Design, vol. 9, 4/26/76, pp. 58-62.

Primary Examiner—C. C. Shaw
Attorney, Agent, or Firm—Harry R. Dumont

[57] ABSTRACT

A set of indicator lights, preferably of the light emitting diode type, are used to provide readout from the gap to indicate a gap open circuit condition, a gap normal machining condition, or a gap short circuit condition, respectively. Three lights are preferably contained in a vertical array to give the operator an exact indication of what type of machining is being carried on and hence inform him as to what correction should be made by way of servo feed adjustment, change of machining current, or the like.

4 Claims, 1 Drawing Figure

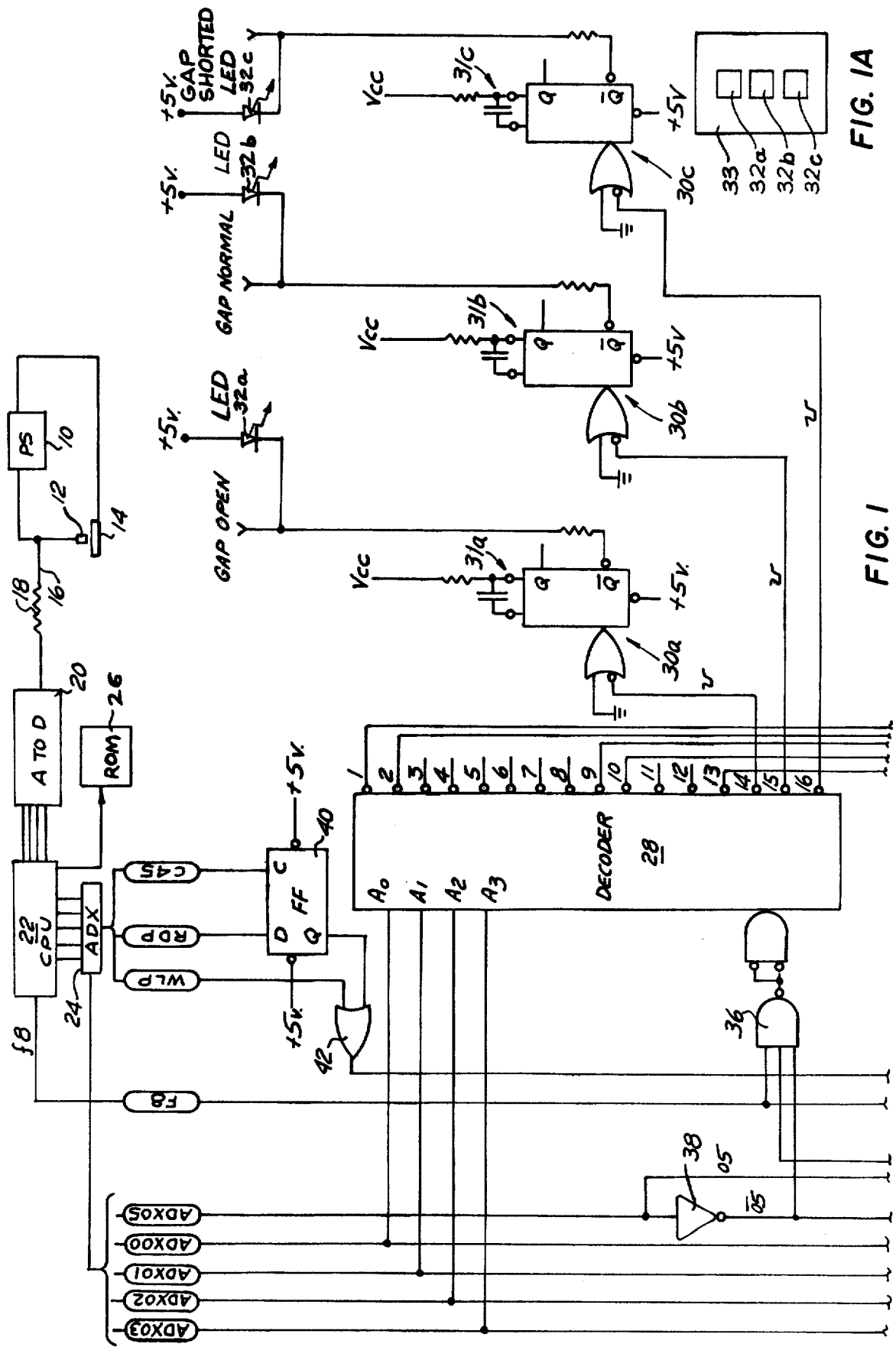

GAP CONDITION LIGHT INDICATOR SYSTEM FOR ELECTRICAL DISCHARGE MACHINING APPARATUS

BACKGROUND OF THE INVENTION

The field to which the present invention relates is that generally known as electrical discharge machining, sometimes hereinafter referred to as "EDM," in which material is removed from an electrically conductive workpiece by the action of precisely controlled electrical gap discharges occurring between a tool electrode and the workpiece. A dielectric coolant fluid is circulated and recirculated through the gap, usually under pressure, throughout the machining operation. An electrode or workpiece servo feed system is used to provide relative movement and thus maintain an optimum gap spacing between the electrode and workpiece as the workpiece material is being removed. It is important in the process of electrical discharge machining that the machining power pulses provided to the gap be closely and precisely controllable in their on-off time and frequency to insure predictability and repeatability of results and to provide appropriate cutting action for the particular type of operation being carried on. For example, with a roughing type machining operation, relatively low frequency, high current magnitude pulses would be used for cutting. For a finishing type machining operation, relatively high frequency, low current magnitude pulses would be employed. Various types of pulse generators which have this capability and adjustability have been developed and are in current commercial use for electrical discharge machining.

SUMMARY OF THE INVENTION

The present invention will thus be seen to provide an indicator system for an EDM pulse generator which is particularly adaptable for providing a machining quality indication by readout from the gap. The readout is derived from a predetermined voltage level which is compared to a level preset and stored by one means or another.

The preferred embodiment of the invention is used with a microprocessor control system and program. The current commercial microprocessor referred to in part in this specification is the model IMP-16 C manufactured and sold by the National Semiconductor Corporation of Santa Clara, California.

The indicator system according to the present invention is controlled in its operation by a combination of transistor, transistor logic (TTL) type integrated circuits of medium scale integration complexity, such as for example the several types hereinafter referred to and which are now made and sold by the National Semiconductor Corporation of Santa Clara, California. The use of such circuits in conjunction with the present invention serves to reduce overall cost and to add to the reliability and operation of the system. The present invention may be operated in conjunction with different devices for providing reference voltages within the different ranges which would indicate one of the three conditions above referred to, that is, either normal cutting, gap open circuit, or gap short circuit. In a preferred embodiment of the invention, the references would be taken from a read only memory (ROM) and processed by a decoder which would make available these values representing gap voltage ranges to the LED indicator system.

BRIEF DESCRIPTION OF THE DRAWINGS

The present invention, which will be described in the appended specification, is illustrated by the accompanying drawing which drawing is a combined schematic and partial block diagramatic showing of our invention.

DESCRIPTION OF THE PREFERRED EMBODIMENT

The power supply 10 provides precisely controllable machining power pulses through the gap which includes the tool electrode 12 and workpiece 14. A signal is taken from the gap to indicate the gap voltage level through a sensing lead 16 and through a series resistor 18. This signal passes through an A to D converter 20. Next shown in the upper portion of the drawing are a central processor unit 22 and an address multiplexer 24 which form a part of the IMP-16C microprocessor along with which this invention will be described. The microprocessor also includes a program memory or ROM 26 as shown. The manner in which the ROM and the remainder of the microprocessor system operate will be further explained in the description of operation hereinafter and further clarified by a part of the program used for the microprocessor.

The address multiplexer 24 includes a plurality of outputs identified ADX-00 through ADX-05. These provide inputs labeled $A_0$, $A_1$, $A_2$ and $A_3$ for a following decoder stage 28. The decoder 28 has a number of outputs numbered 1 through 16 at its right hand margin. The output terminals labeled 14, 15 and 16 are connected respectively to a set of three retriggerable, resettable monostable multivibrators 30a, 30b, and 30c. The first monostable multivibrator 30a has associated with it an LED 32a which when lit indicates a gap open condition. The second monostable multivibrator 30b has associated with it an LED 32b which when lit indicates a gap normal condition. The third monostable multivibrator 30c has associated with it an LED 32c which when lit indicates a gap shorted condition. The above three monostable multivibrators may be of the type 9602 manufactured by the Signetics Corporation of Sunnyvale, California. Each of the monostable multivibrators has associated with it the appropriate voltages to provide its operation and further includes a Q and $\bar{Q}$ output as shown. Also shown at the upper end of the block for the monostable multivibrators are their external RC timing networks denoted generally by the numerals 31a, 31b, and 31c, respectively.

Also shown coupled to the central processor unit or CPU 22 is a flag F8 output which is coupled through a three input NAND gate 36 to the decoder 28 and allows the output of the decoder 28 to be pulsed under the proper conditions. This will be further explained in connection with the "description of operation" section hereinafter. Operating in conjunction with the three input NAND gate 36 is an inverter 38 which provides a $\overline{05}$ output to one of the input terminals of the three input NAND gate 36. It will thus be seen that the function of the inverter 38 is to select either the decoder 28 used for the gap indicator system or another one used in the computer control system. It will be further understood that the central processor unit 22 has available to it additional addresses to be sent to peripheral devices to enable them to read as for example through RDP or to write through WRP. Also a clock pulse C45 is sent forth by the central processor unit 22. In the operation of the microprocessor, it is necessary that the peripheral devices which we desire to write data be specified and alternately the peripheral devices that we want to read data from must be specified. This is done in the normal manner through the operation of an intermediate flip-flop 40 and an associated AND-OR gate 42.

DESCRIPTION OF OPERATION

The present invention will now be described with respect to its general operation. The three indicator lights or Leds 32a, 32b, and 32c act as indicating windows in the gap voltage. For example, any gap voltage value above 50 volts would be considered to be an open circuit and anything below 20 volts would be considered a short circuit. In a typical electrical discharge machining power supply, gap voltage in the range of 22 to 32 volts would be considered as being normal or even optimum machining voltage. If the operator tends to overfeed the servo system, more gap short voltage level pulses would result. In general terms, the microprocessor responds to the output of the analog-digital converter 20. It progresses through its program and if the voltage is for example 28 volts and the window has been set at 22 to 32, 28 volts will be read. The microprocessor then will state if it is greater than 32. If it is greater than 32 it will branch one way, or if it is not greater than 32 it will branch another way. This comparison is controlled by the software and the ROM 26. The next comparison will be to say whether it is greater or not greater than 22. Once it has been determined whether or not the gap voltage measured through the sensing lead 16 is between the number defining a range, for example, between 22 and 32 volts, an address will be selected through address buses ADX00-ADX03 with inputs to terminals A$_0$, A$_1$, A$_2$, and A$_3$ of the decoder 28. This will be decoded by the decoder 28 and one of the three different outputs available from the decoder 28 will be pulsed as shown. If the normal arc voltage level is present the monostable multivibrator 30b will be triggered through output 15 on the negative edge of a negative going pulse as shown. So long as the LED 32b is being triggered before its time period is up, its output will stay energized. Thus the light will stay on to indicate gap normal cutting voltage.

For the shorted condition, a different address is provided and the decoder 28 provides an address of 16 to indicate the short circuit condition. For the open circuit condition an address of 14 is provided to light LED 32a. The function of ADX05 along with Flag F8 is to select the decoder 28 or any one of a number of other like decoders in the system. Addresses ADX00 through ADX03, as already indicated, select the appropriate one of the sixteen outputs of the particular decoder 28.

It will be understood that the present invention offers a gap voltage set up suitable to guide the operation in regulating machining at a particular and preferred voltage level. It gives the operator a much more rapid and accurate indication of what is going on at the gap than the typical gap voltage meter being used with EDM equipment. It will be further understood that the present system, while it is described as a three light system, is readily adaptable to a system of some ten or sixteen indicator lights. In this way if the lights are arrayed vertically there will be a progression from a mid range indicating a gap normal voltage system upward to indicating a gap open circuit condition or downward at the lower extreme indicating a shorted gap condition. The physical arrangement of the three LED's 32a, b, and c behind cover 33 is shown in FIG. 1A.

The gap condition light indicator system will now be described with more particular reference to the IMP-16C microprocessor and to a typical and specific program for implementing the light indicator system.

The following is a program in the IMP-16C language:

```
8φφ5 A—LT:LD—φ,5
F1FC A—SKNE φ,R1      21φA A—JMP P1
F1FB A—SKNE φ, R2
21φ1 A—JMP P2
E1F8 A—SKG φ, R1
21φ1 A—JMP .+2
21φ5 A—JMP P1
E1F6 A—SKG φ,R2
21φ1 A—JMP .+2
21φ4 A—JMP P2
φ88D A—PELG φ,15
φ2φφ A—RTS
φ88F A—P1: PELG φ,13
21FD A—JMP .−2
φ88E A—P2: PFLG φ,14
21FB A—JMP .−4
```

The general purpose of the program is to relate the operation of the microprocessor to the control of the three LED lights 32a, 32b, and 32c. The routine accomplishing this is labeled LT and is the main part of the program. Before this portion of the program is reached we have already read the A to D converter 20 and stored the actual word representing its computation in a location in memory ROM 26. This word will be used throughout the program to show what the gap voltage was at the last time it was read. The program begins by getting that word from a location 5 where it was stored into the accumulator in the CPU 22. At that point we compare it to a label which is R. This label in the present instance has been equated to a 90 hex binary word. If they are equal, at this point we will jump to a place in the program called P1. At P1 we will find out if it is greater than the label P1 or to a different label which has been equated to a 64 hex. If it were greater, it will jump to a point in the memory called P2. Essentially what the program does is to read the A to D converter output, derive the binary representation of the gap voltage, compare it to constants 90 (32 volts) and 64 (22 volts) hex, find out if it is equal to those constants or greater than those constants. If it were less than both of those constants, we would always turn on the gap shorted LED 32c. If it were equal to or greater than 90 hex, we would turn on the gap open LED 32a. If it were equal to or greater than 64, but less than 90, we would turn on the gap normal LED 32b. It should be born in mind that we are talking about binary representations of the voltage, not the actual voltage values themselves. It will be understood that the above program represents one readily operable with the IMP 16C microprocessor or any like commercial microprocessor or computer now commercially available on the market.

It will thus be seen that we have provided a greatly improved light indicator system for electrical discharge machining in which the light indicators are used to indicate gap open, gap normal, or gap shorted voltage conditions.

We claim:

1. A system for indicating gap machining condition for an electrical discharge machining apparatus, comprising:

a means for sensing gap voltage and providing a first signal representative of gap voltage;

a means for prestoring a pair of reference signals representative of the upper and lower limits, respectively, and thus defining a normal gap voltage cutting range;

a means for comparing said first signal to each of said pair of reference signals, and an array of indicators for providing a visual output representative of the first signal being above, within, or below said range;

said array including at least three indicators arrayed in a vertical display, only the bottom one operated responsive to said first signal being below the normal range and representative of gap short circuit, only the middle one operated responsive to said first signal being within the normal range and representative of normal cutting, and only the top one operated responsive to said first signal being above the normal range and representative of gap circuit.

2. The combination as set forth in claim 1 wherein said indicators comprise a plurality of aligned LED's in a linear arrangement.

3. The combination as set forth in claim 2 wherein a separate monostable multivibrator is coupled to each of said LED's for firing it separately.

4. The combination as set forth in claim 1 wherein said pair of reference signals are preselected and prestored in a microprocessor read only memory for comparison to said first signal.

* * * * *